US008496996B2

(12) United States Patent
Tonomura et al.

(10) Patent No.: US 8,496,996 B2
(45) Date of Patent: Jul. 30, 2013

(54) METHOD OF FORMING A BRILLIANT MULTI-LAYERED COATING FILM

(75) Inventors: Hironori Tonomura, Nishikamo-gun (JP); Yoshizumi Matsuno, Nishikamo-gun (JP); Yasushi Nakao, Nishikamo-gun (JP)

(73) Assignee: Kansai Paint Co., Ltd., Hyogo (JP)

( * ) Notice: Subject to any disclaimer, the term of this patent is extended or adjusted under 35 U.S.C. 154(b) by 1198 days.

(21) Appl. No.: 11/921,654

(22) PCT Filed: Jun. 8, 2006

(86) PCT No.: PCT/JP2006/311976

§ 371 (c)(1),
(2), (4) Date: Jan. 2, 2008

(87) PCT Pub. No.: WO2006/132437

PCT Pub. Date: Dec. 14, 2006

(65) Prior Publication Data

US 2008/0292802 A1 Nov. 27, 2008

(30) Foreign Application Priority Data

Jun. 9, 2005 (JP) ................................ 2005-169532

(51) Int. Cl.
*B05D 1/36* (2006.01)
*C09C 1/02* (2006.01)

(52) U.S. Cl.
USPC .................... 427/407.1; 427/409; 427/412.3; 427/412.5; 427/388.4; 106/287.2; 106/461

(58) Field of Classification Search
USPC ........................ 427/393.5, 407.1, 385.5, 402
See application file for complete search history.

(56) References Cited

U.S. PATENT DOCUMENTS

| | | | | |
|---|---|---|---|---|
| 4,728,545 | A * | 3/1988 | Kurauchi et al. | 427/409 |
| 4,781,949 | A * | 11/1988 | Kasari | 427/407.1 |
| 5,709,909 | A * | 1/1998 | Leibfarth et al. | 427/407.1 |
| 5,719,234 | A * | 2/1998 | Yabuta et al. | 525/101 |
| 5,968,655 | A * | 10/1999 | Hartung et al. | 428/423.1 |
| 2001/0005732 | A1 * | 6/2001 | Buter et al. | 524/501 |
| 2003/0148129 | A1 * | 8/2003 | Magoshi et al. | 428/480 |
| 2003/0175437 | A1 * | 9/2003 | Tsuda et al. | 427/385.5 |
| 2007/0104874 | A1 * | 5/2007 | Ogawa et al. | 427/372.2 |

FOREIGN PATENT DOCUMENTS

| | | | |
|---|---|---|---|
| GB | 2 351 680 | | 1/2001 |
| GB | 2 351 680 | A | 10/2001 |
| JP | 2004-351389 | A | 12/2004 |
| JP | 2004-351391 | A | 12/2004 |
| WO | 2004/105965 | A1 | 12/2004 |

OTHER PUBLICATIONS

Stoye et al [ed.], "Paints, Coatings and Solvents Second, Completely Revised Edition", Wiley-VCH, 1998, New York, pp. 4-5.*

* cited by examiner

*Primary Examiner* — Dah-Wei Yuan
*Assistant Examiner* — Jose Hernandez-Diaz
(74) *Attorney, Agent, or Firm* — Wenderoth, Lind & Ponack, L.L.P.

(57) ABSTRACT

This invention provides a method for forming brilliant multi-layered coating film excelling in brilliance, which comprises the steps of applying an effect pigment-containing water-borne base coating composition (A1) having a coating film viscosity ($V_{A1}$) after 1 minute of its application of 10-500 Pa·sec onto a substrate to form a first base coating film; and applying an effect pigment-containing water-borne base coating composition (A2) having a coating film viscosity ($V_{A2}$) after 1 minute of its application of 5-200 Pa·sec onto the first base coating film while the viscosity ($V_{A3}$) of the first base coating film is 10-500 Pa·sec, the viscosity ratio ($V_{A1}$)/($V_{A2}$) being 1.3/1-35/1.

23 Claims, No Drawings

METHOD OF FORMING A BRILLIANT MULTI-LAYERED COATING FILM

TECHNICAL FIELD

This invention relates to a coating method of effect pigment-containing water-borne base coating compositions which a used for coating automobiles and the like. In particular, the invention relates to a method for forming multi-layered coating film having excellent brilliance.

BACKGROUND ART

Top coating compositions to coat outer panels of automobiles are required to provide top coating film exhibiting color appearance of high grade. To meet this demand, effect pigment-containing base coating compositions are developed.

Base coating compositions in general are for forming underlayer part coating film where the top coating film is composed of multi-layers of coating films. By forming a multi-layered film by applying a transparent clear coating film on a base coating film formed of such a base coating composition, a top coating film exhibiting color appearance of high grade can be obtained, which has both excellent color appearance attributable to the base coating film and superb gloss and surface smoothness attributable to the clear coating film.

Effect pigment normally has laminar or flaky structure and is oriented in the coating film in parallel with the substrate surface to glitter brightly and change color tone according to viewing directions, whereby forming a coating film of unique color appearance. Of such properties, the one of changing the color tone according to change in viewing directions is referred to flip-flop property (FF property), greater changes in color tone signifying higher flip-flop property and better brilliance of the coating film containing the effect pigment.

Conventionally, organic solvent-based base coating compositions have been widely used for effect pigment-containing base coating compositions. Recently, however, water-borne base coating compositions causing less environmental pollution are increasingly adopted, due to environmental pollution with volatilization of the organic solvent during baking of applied coating film. Whereas, it is more difficult to obtain stable appearance with water-borne base coating compositions as compared with organic solvent-based base coating compositions, because of low volatilization rate of water, which is the diluent, from their coating films and, furthermore, because the volatilization rate is significantly affected by ambient application conditions, in particular, temperature and humidity. Thus, coating films of water-borne base coating compositions are subject to the problem that degradation in brilliance is apt to be invited by decrease in flip-flop property or occurrence of unevenness in metallic finish.

In industrial coating lines, normally the work is separately conducted for each zone using a same kind of coating composition, whereby to control degradation in coating quality caused by scattered coating composition's sticking on the substrate or coated film. For example, an automobile coating line is generally divided into undercoating zone, intermediate coating zone, base coating zone and clear coating zone.

Also within each of such coating zones, normally the coating operation is divided into two or more steps and a setting time of from about 30 seconds to 3 minutes is provided between the steps to prevent sagging of coating composition and secure high coating quality. Such coating steps within a same zone are referred to, by the order of being conducted, as the first stage, second stage, and so on.

In the recent years, as one of the means for obtaining coated articles with coating film of high brilliance using water-borne base coating compositions inducing less environmental pollution, a coating method is proposed in which different specific effect pigment-containing water-borne base coating compositions are used for the first and second stages at a base coating zone.

For example, JP2004-351389A discloses a coating film-forming method comprising applying a water-borne first brilliant base coating composition having a solid content of 10-45 mass % in the first stage of the base coating zone to form a first base coating film; and applying in the second stage a water-borne second brilliant base coating composition having a solid content of 10-40 mass % on the first base coating film to form a second base coating film, the ratio between the solid contents of the water-borne first brilliant base coating composition and the water-borne second brilliant base coating composition being 1.1/1-4/1. However, this coating film-forming method is subject to a problem that layer-mingling takes place at the interface of the coating films in the occasion of forming the second base coating film on the first base coating film at the second stage, presumably due to the difference in solid content of the two coating films, which disturbs orientation of the effect pigments in the vicinity of the interface and occasionally degrade the brilliance.

Also JP 2004-351390A discloses a coating film-forming method comprising forming a first base coating film with a water-borne first brilliant base coating composition in which the mass concentration of effect pigment in the composition is 1-30%, in the first stage of the base coating zone, and forming in the second stage a second base coating film with a water-borne second brilliant base coating composition in which the mass concentration of effect pigment in the composition is 5-40%, the ratio between the mass concentration of effect pigment in the water-borne first brilliant base coating composition and that in the water-borne second brilliant base coating composition being 1/4-1/1.1.

However, this coating film-forming method is subject to a problem that orientation of the effect pigment in the second base coating film is disturbed to reduce brilliance or the second base coating film tends to become relatively brittle and occasionally comes off, because of the high mass concentration of the effect pigment in the second base coating film.

Furthermore, JP2004-351391A discloses a coating film-forming method comprising forming a water-borne first base coating film with a water-borne first brilliant base coating composition in the first stage of the base coating zone, the mass ratio in the solvent of said composition being: organic solvent/water=5/95-49/51, said organic solvent containing 40-100 mass % of a specific organic solvent which has an evaporation rate of 150-800 (where the evaporation rate of n-butyl acetate at 25° C. is set to be 100) and a solubility parameter of 9.5-14.5, and then forming in the second stage a water-borne second base coating film with a water-borne second brilliant base coating composition. This coating film-forming method, however, is liable to induce environmental pollution because a larger amount of organic solvent must be used compared with ordinary water-borne base coating composition.

DISCLOSURE OF THE INVENTION

A main object of the present invention is to provide a coating method of effect pigment-containing water-borne base coating compositions, which can form brilliant multi-layered base coating film excelling in brilliance and coating film strength.

We have engaged in concentrative studies for accomplishing the above object and now discovered: in the occasion of successively applying plural effect pigment-containing water-borne base coating compositions onto a substrate, when an effect pigment-containing water-borne base coating composition for forming the first base coating film, which has a relatively high viscosity within a specific range at one minute after its application and an effect pigment-containing water-borne base coating composition for forming the second base coating film, which has a relatively low viscosity within a specific range at one minute after its application are successively applied in combination, mingling of the layers at the interface of the first base coating film and the second base coating film is prevented, inducing less disturbance in orientation of effect pigments in the vicinity of the interface; and furthermore the effect pigment in the second base coating film is oriented in parallel with the substrate with greater ease, to form a brilliant multi-layered base coating film having excellent brilliance. The present invention is whereupon completed.

Thus, the present invention provides a method for forming brilliant multi-layered coating film, which comprises the steps of (1) applying an effect pigment-containing water-borne base coating composition (A1) onto a substrate to form a first base coating film, (2) applying an effect pigment-containing water-borne base coating composition (A2) onto the uncured first base coating film to form a second base coating film, and (3) heat-curing the two coating films, the method being characterized in that (i) the effect pigment-containing, water-borne base coating composition (A1) has a viscosity ($V_{A1}$), as measured under the conditions of shear rate of 0.1 $sec^{-1}$ and 23° C. in temperature, at one minute after its application, within a range of 10-500 Pa·sec;

(ii) the effect pigment-containing water-borne base coating composition (A2) has a viscosity ($V_{A2}$), as measured under the conditions of shear rate of 0.1 $sec^{-1}$ and 23° C. in temperature, at one minute after its application, within a range of 5-200 Pa·sec;

(iii) the ratio between the viscosities, ($V_{A1}$)/($V_{A2}$), lies within a range of 1.3/1-35/1; and (iv) the effect pigment-containing water-borne base coating composition (A2) is applied while the viscosity ($V_{A3}$) of the first base coating film, as measured under the conditions of shear rate of 0.1 $sec^{-1}$ and 23° C. in temperature, is within a rang of 10-500 Pa·sec.

According to the method of the present invention, brilliant multi-layered coating film excelling in brilliance and coating film strength can be formed using effect pigment-containing water-borne base coating compositions. Therefore, such brilliant multi-layered coating film formed by the method of this invention is particularly useful for coating of automobile bodies.

The method of this invention is applicable to all industrial coating lines as earlier described in which different effect pigment-containing water-borne base coating compositions are used in the first stage coating and second stage coating in a base coating zone, whereby forming on substrates coating films having very excellent brilliance.

In the present specification, "base coating film" signifies, where a top coating film formed on a substrate consists of multiple film layers, the coating film placed at the underlayer side. A top coating film is formed on a substrate with the view to impart excellent appearance (e.g., high color effect, high gloss, surface smoothness and the like) and weatherability. In particular, a brilliant top coating film is generally composed of a multi-layered coating film comprising effect pigment-containing base coating films exhibiting excellent color appearance and a clear coating film formed thereon, which has high gloss and excels in coating film performance such as surface smoothness and weatherability.

Hereinafter the brilliant multi-layered coating film-forming method of the invention is explained in further details.

According to the method of the invention, an effect pigment-containing water-borne base coating composition (A1) is applied onto a substrate as the first step, to form a first base coating film. As the effect pigment-containing water-borne base coating composition (A1), those having a viscosity ($V_{A1}$) at 1 minute after their application within a range of 10-500 Pa·sec, preferably 30-250 Pa·sec, inter alia, 50-100 Pa·sec can be used. By the use of an effect pigment-containing water-borne base coating composition (A1) having the viscosity ($V_{A1}$) at 1 minute after its application within the above-specified range, brilliant coating film having excellent appearance and surface smoothness can be obtained.

The substrate onto which the method of the invention is applicable is not subject to particular limitations. For example, outer panels of automobile bodies such as of passenger cars, trucks, motorcycles, buses and the like; car parts; and outer panels of household electric appliances such as mobile telephones, audio instruments and the like can be named. In particular, outer panels of automobile bodies and car parts are preferred.

Base materials constituting these substrates are subject to no particular limitation and, for example, metal sheet such as of iron, aluminum, brass, copper, stainless steel, tin plate, galvanized steel, alloyed zinc (Zn—Al, Zn—Ni, Zn—Fe and the like)-plated sheet steel and the like; plastic materials such as resins, e.g., polyethylene resin, polypropylene resin, acrylonitrile-butadiene-styrene (ABS) resin, polyamide resin, acrylic resin, vinylidene chloride resin, polycarbonate resin, polyurethane resin, epoxy resin and the like, and various FRP's; inorganic materials such as glass, cement, concrete and the like; timber; and fibrous materials (paper, fabric) and the like can be used. In particular, metal or plastic materials are suitable.

The substrate may be those made of above-described base materials on which an undercoating film or undercoating plus intermediate coating films are formed. Where the base material is a metal, preferably it is given a chemical conversion treatment with phosphate, chromate or the like in advance of forming undercoating film.

An undercoating film is formed for the purpose of imparting anti-corrosion property, rust preventive property, intimate adhesion to the base material or concealing ability of unevenness on the base material surface (occasionally referred to as "ground-concealing property") to the substrate. As undercoating compositions for forming such undercoating film, those per se known can be used, for example, on conductive base materials such as metals, cationic or anionic electrodeposition coating compositions are preferred, and on low-polarity base materials such as polypropylene, use of chlorinated polyolefin resin-type coating compositions is preferred.

Undercoating compositions may be cured after their application by such means as heating or blasting, or may be dried to an extent not causing curing. Where a cationic or anionic electrodeposition coating composition is used as the undercoating composition, preferably the undercoating composition is heated after application to be cured, for preventing interlayer-mingling between the undercoating film and a coating film successively formed on the undercoating film and for forming a multi-layered coating film of favorable appearance.

An intermediate coating film is formed on the undercoating film, for the purpose of imparting intimate adhesion to undercoating film, ability to conceal color of the undercoating film ("color-concealing property"), ability to conceal unevenness on the undercoating film surface, anti-tipping property and the like.

An intermediate coating film can be formed by applying an intermediate coating composition. Its normally preferred film thickness is within a range of 10-50 μm, in particular, 15-30 μm, in terms of cured film thickness.

As intermediate coating compositions, those per se known can be used, for example, intermediate coating compositions comprising as the vehicle component a main resin such as hydroxyl-containing polyester resin hydroxyl-containing acrylic resin and the like, and a crosslinking agent such as melamine resin, blocked polyisocyanate and the like can be named.

Intermediate coating film is preferably cured or dried to such an extent that its drying can be sensed with finger touch, to prevent interlayer-mingling with the coating composition to be applied successively onto the intermediate coating film and to form a multi-layered coating film of excellent appearance.

Then, in the second stage, on the uncured first base coating film formed in the first stage, an effect pigment-containing water-borne base coating composition (A2) is applied to form a second base coating film. As the effect pigment-containing water-borne base coating composition (A2), those forming coating films of relatively lower viscosity than that of effect pigment-containing water-borne base coating composition (A1), i.e., those having coating film viscosity ($V_{A2}$) at one minute after their application within a range of 5-200 Pa·sec, preferably 8-80 Pa·sec, inter alia, 1-50 Pa·sec, are used, the ratio between the viscosity values at one minute after application of the effect pigment-containing water-borne base coating composition (A1) and the effect pigment-containing water-borne base coating composition (A2), i.e., ($V_{A1}$)/($V_{A2}$), being within a range of 1.3/1-35/1, preferably 2/1-25/1, inter alia, 2.5/1-15/1.

Said viscosity at a minute after application of effect pigment-containing water-borne base coating compositions as referred to in this specification is the viscosity measured as follows. An effect pigment-containing water-borne base coating composition is applied onto a 45 cm-long, 30 cm-wide and 0.8 mm-thick tin plate, with a rotary bell atomizer, ABB Cartridge Bell Coater (tradename, ABB Co.) by single time application, to a dry film thickness of 12 μm in case of an (A1) coating composition and to that of 3 μm in case of an (A2) coating composition. The coating operation conditions are as follows: the bell diameter=77 mm, the bell rotation number=25,000 rpm, shaping air flow rate=700 NL/min., applied voltage=−60 kV, temperature=23° C. and humidity=75%. One minute after application of the effect pigment-containing water-borne base coating composition onto the tin plate, a part of the coating film is scratched off with a spatula or the like. Viscosity of this sample is measured with viscoelasticity measuring instrument at 23° C., varying the shear rate from 10,000 $sec^{-1}$ to 0.0001 $sec^{-1}$. The viscosity measured at 0.1 $sec^{-1}$ is recorded. As the viscoelasticity measuring instrument, HAAKE RheoStress RS150 (tradename, HAAKE Ltd.) can be used.

In the above, the unit for shaping air flow rate, NL/min, is a unit generally used with gas-measuring area flow meters, which is a volume of shaping air passing through the pipe for one minute, as converted to the volume under standard condition (0° C., 1 atm. [atmospheric pressure]).

The viscosity at one minute after application of effect pigment-containing water-borne base coating composition can be controlled by, for example, blending rheology-controlling agent or adjusting solid content of the composition.

As the rheology-controlling agent, for example, inorganic thickener such as silicate, metal silicate, montmorillonite, organic montmorillonite, colloidal alumina and the like; polyacrylic acid thickener such as sodium polyacrylate, polyacrylic acid-(meth)acrylic acid ester copolymer and the like; urethane-associated type thickener which exhibits effective thickening action, as it contains urethane bond and polyether chain per molecule and the urethane bonds are mutually associated in an aqueous medium (including commercialized products, e.g., UH-814N, UH-462, UH-420, UH-472 and UH-540 by Asahi Denka Co., Ltd.; SN Thickener612, SN Thickener621 N, SN Thickener 625 N and SN Thickener 627N by SAN NOPCO Ltd., etc.); cellulose derivatives thickener such as carboxymethyl cellulose, methyl cellulose, hydroxyethyl cellulose and the like; protein thickener such as casein, sodium caseinate, ammonium caseinate and the like; alginic acid thickener such as sodium alginate; polyvinyl thickener such as polyvinyl alcohol, polyvinylpyrrolidone, polyvinyl benzyl-ether copolymers and the like; polyether thickener such as Pluronic polyether, polyether dialkyl ester, polyether dialkyl ether, polyether epoxy-modified product and the like; maleic anhydride copolymer thickener such as partial esters of vinyl methyl ether-maleic anhydride copolymers; and polyamide thickener such as polyamide amine salts and the like can be named. Of these, use of polyacrylic acid thickener or urethane-associated thickener is preferred. In particular, that of urethane-associated thickener is most convenient. These rheology-controlling agents can be used either singly or in combination of two or more.

At the second stage, such an effect pigment-containing water-borne base coating composition (A2) is applied onto the uncured first base coating film, while the first base coating film has a viscosity ($V_{A3}$) within a range of 10-500 Pa·sec, preferably 30-250 Pa·sec, inter alia, 50-100 Pa·sec.

In the specification, the viscosity ($V_{A3}$) of uncured first base coating film is the value measured of a sample scratched off from the first base coating film on the substrate with a spatula or the like immediately before applying the effect pigment-containing water-borne base coating composition (A2), with an viscoelasticity measuring instrument at 23° C. at a shear rate of 0.1 $sec^{-1}$, while the shear rate is being varied from 10,000 $sec^{-1}$ to 0.0001 $sec^{-1}$. As the viscoelasticity measuring instrument, HAAKE RheoStress RS150 (tradename, HAAKE Ltd.) can be used.

Application of an effect pigment-containing water-borne base coating composition onto the substrate can be conducted by the means known per se. For example, it can be applied with brush, but coating machines are generally used. As coating machines useful in such occasions, for example, rotary atomizing-type electrostatic coater, airless spray coater, air spray coater and the like can be named, rotary atomizing type electrostatic coater being particularly preferred. As a rotary bell atomizer, ABB Cartridge Bell Coater (tradename, ABB Co.) can be named. Also in coating lines for automobiles, paint cassette-type coater allowing easy switching of coating compositions, in particular, paint cassette-type rotary atomizing system electrostatic coater, is preferred.

Preferably, no pre-heating is conducted between the end of an effect pigment-containing water-borne base coating composition (A1) application and initiation of an effect pigment-containing water-borne base coating composition (A2) application, and an interval in the order of 30 seconds—3 minutes is provided.

The first base coating film preferably has a dry film thickness ($T_{A1}$) normally ranging 5-15 μm, in particular, 7-12 μm, and the second base coating film preferably has a dry film thickness ($T_{A2}$) normally ranging 1-5 μm, in particular, 2-4 μm. Again, it is normally preferred that the ratio of the dry film thickness ($T_{A1}$) of the first base coating film to dry film thickness ($T_{A2}$) of the second base coating film, $T_{A1}/T_{A2}$, is in the range of 1.5/1-5/1, in particular, 2/1-4/1.

In the present specification, dry film thickness of the first or second base coating film is a value measured with an electromagnetic film thickness gauge. For example, in the occasion of applying an effect pigment-containing water-borne base coating composition (A1) onto a substrate in the first stage, the same coating composition is similarly applied onto a steel sheet (1); subsequently in the second stage, in the occasion of applying an effect pigment-containing water-borne base coating composition (A2) onto the uncured first base coating film on the substrate, the same coating composition is similarly applied onto another steel sheet (2) different from the first steel sheet (1); and further in the third stage, simultaneously with heat-curing the first base coating film and the second base coating film on the substrate, the first base coating film on the steel sheet (1) and the second base coating film on the steel sheet (2) are heat-cured, and the dry film thickness of the first base coating film on the steel sheet (1) and that of the second base coating film on the steel sheet (2) are measured, to give the dry film thickness values.

According to the method of the preset invention, a clear coating composition may be applied onto the second base coating film, where necessary. While such a clear coating composition can be applied after the first and second base coating films are heat-cured, and then heat-cured separately, it is generally preferred to apply the clear coating composition on uncured second base coating film and heat-cure the same. In that case, preferably a pre-heating is conducted at a temperature which will not cure the applied second base coating film, to dry the same film. A convenient pre-heating temperature ranges 50-100° C. and pre-heating time, from about 30 seconds to about 10 minutes, in particular, from about 1 to about 5 minutes. Application of a clear coating composition can be effected by any means known per se, for example, using a coating machine such as rotary atomizing system electrostatic coater, airless spray coater, air spray coater or the like.

Thus formed coating film can generally be cured by heating at about 100-about 180° C., preferably at about 120-about 160° C., for around 10-40 minutes. Whereupon a multi-layered coating film having excellent appearance can be obtained.

In the above-described method of the present invention, as effect pigment-containing water-borne base coating compositions, water-borne coating compositions comprising water-soluble or water-dispersible main resin (a), curing agent (b) and effect pigment (c) can be used.

As the main resin (a), resins containing sufficient amount of hydrophilic groups for making the resin water-soluble or water-dispersible, and functional groups capable of cross-linking reaction with the curing agent (b), such as acrylic resin, polyester resin, alkyd resin, epoxy resin, polyurethane resin and the like, can be named, which can be used each singly or in combination of two or more. Of those, acrylic resin or polyester resin are preferred. As the hydrophilic groups, for example, carboxyl, hydroxyl, methylol, amino and sulfo groups, polyoxyethylene bond and the like can be named, among which carboxyl group is preferred. As the functional groups crosslinkable with curing agent (b), hydroxyl group is particularly preferred.

As the main resin (a), acrylic or polyester resin having carboxyl and hydroxyl groups are particularly preferred.

Where the main resin (a) has an ion-forming group such as carboxyl as the hydrophilic group, the resin can be water-solubilized or made water-dispersible by neutralizing said group with, for example, a basic substance or an acid. The main resin (a) can be made water-dispersible also by carrying out the polymerization to form the main resin (a), by emulsion-polymerizing the monomeric component(s) in the presence of a surfactant or a water-soluble high molecular compound. Liquid system in which resin particles in water-dispersible state are dispersed in an aqueous medium is generally referred to as "emulsion", and in this specification also such a system wherein water-dispersible resin is dispersed in an aqueous medium is called an emulsion.

As the acrylic resin having carboxyl and hydroxyl groups, for example, an acrylic resin which is obtained by copolymerizing carboxyl-containing unsaturated monomer, hydroxyl-containing unsaturated monomer and other unsaturated monomer can be named. It is generally preferred for such an acrylic resin to have a number-average molecular weight ranging 3,000-100,000, in particular, 5,000-50,000. It is also normally preferred that the acrylic resin has an acid value ranging 10-150 mgKOH/g, in particular, 15-100 mgKOH/g.

In the present specification, number-average molecular weight and weight-average molecular weight of the resins such as acrylic resin, polyester resin, melamine resin and the like are the number-average or weight-average molecular weight measured with gel permeation chromatograph ("HLC 8120GPC", tradename, Tosoh Corporation), as converted based on the number-average or weight-average molecular weight of polystyrene. Said gel permeation chromatograph is operated using four columns of "TSKgel G-4000H×L", "TSKgel G-3000H×L", "TSKgel G-2500H×L" and "TSKgel G-2000H×L" (tradenames, Tosoh Corporation), under the conditions of mobile phase=tetrahydrofuran, measuring temperature=40° C., flow rate=1 mL/min. and the detecter=RI.

As the carboxyl-containing unsaturated monomers, for example, monocarboxylic acid such as (meth)acrylic acid, crotonic acid; dicarboxylic acid such as maleic acid, fumaric acid, itaconic acid; and half monoalkyl esterified products of these dicarboxylic acids can be named, which can be used each singly or in combination of two or more.

As the hydroxyl-containing unsaturated monomers, for example, $C_1$-$C_{24}$ hydroxyalkyl esters of (meth)acrylic acid such as 2-hydroxyethyl(meth)acrylate, 2- or 3-hydroxypropyl(meth)acrylate, 4-hydroxybutyl(meth)acrylate and the like can be named, which can be used either singly or in combination of two or more.

As the other unsaturated monomers, for example, $C_1$-$C_{24}$ alkyl esters or cycloalkyl esters such as methyl(meth)acrylate, ethyl (meth)acrylate, n- or i-propyl(meth)acrylate, n-, i- or t-butyl (meth)acrylate, 2-ethylhexyl(meth)acrylate, cyclohexyl (meth)acrylate, lauryl(meth)acrylate and the like; glycidyl (meth)acrylate, isobornyl(meth)acrylate, acrylonitrile, acrylamide, N,N'-dimethylaminoethyl methacrylate, N,N'-methylenebisacrylamide, styrene, vinyltoluene, vinyl acetate, vinyl chloride, 1,6-hexanediol diacrylate and the like can be named, which can be used either singly or in combination of two or more.

Copolymerization of above-named monomers can be carried out by the means known Per se, for example, emulsion polymerization, solution polymerization or the like.

As the main resin (a), preferably at least one kind of water-dispersible acrylic resin which is obtained as above is used. In particular, multi-layer structured, particulate water-dispersible acrylic resin is advantageous. As the multi-layer structured, particulate water-dispersible acrylic resin, one prepared with use of, as a part of the unsaturated monomers for constituting the acrylic resin, amido-containing unsaturated monomer having at least two unsaturated groups per molecule and methacrylic acid is preferred, because it can provide a film excelling in brilliance and water resistance.

Water-dispersible acrylic resin can be obtained by, for example, single stage or multi-stage emulsion polymerization of a mixture of above-described unsaturated monomers in the presence of a dispersion stabilizer such as a surfactant. In that occasion, a multi-layer-structured, particulate, water-dispersible acrylic resin can be obtained by carrying out the emulsion polymerization in multi-stages.

Carboxyl groups in acrylic resin can be neutralized with a basic substance where necessary, and whereupon the acrylic resin can be rendered water-dispersible. The neutralization is preferably conducted before mixing the resin with the curing agent (b), etc. The basic substance preferably is water-soluble, which can be, for example, ammonia, methylamine, ethylamine, propylamine, butylamine, dimethylamine, trimethylamine, triethylamine, ethylenediamine, morpholine, methylethanolamine, 2-(dimethylamino)ethanol, diethanolamine, triethanolamine, diisopropanolamine, 2-amino-2-methylpropanol and the like. They can be used each singly or in combination or two or more. Of these, 2-(dimethylamino) ethanol, diethanolamine and triethanolamine are particularly preferred.

As polyester resin containing carboxyl groups and hydroxyl groups, for example, those obtained by subjecting polyhydric alcohol, polyvalent carboxylic acid and still other compound(s) which may be used where necessary, to dehydrative condensation by per se known means can be named. It is generally preferred for the polyester resin to have number-average molecular weight ranging 500-50,000, in particular, 1,000-20,000. Again, normally the polyester resin preferably has an acid value within a range of 10-150 mgKOH/g, in particular, 15-100 mgKOH/g.

As the polyhydric alcohol, for example, ethylene glycol, diethylene glycol, propylene glycol, butanediol, pentanediol, 1,6-hexanediol, 2,2-dimethylpropanediol, glycerine, trimethylolpropane, pentaerythritol and the like can be used, which can be used either singly or in combination of two or more.

As the polyvalent carboxylic acid, for example, phthalic acid, isophthalic acid, terephthalic acid, tetrahydrophthalic acid, hexahydrophthalic acid, malonic acid, succinic acid, adipic acid, sebacic acid, trimellitic acid, pyromellitic acid and anhydrides thereof can be used, which can be used either singly or in combination of two or more.

As the other compounds which can be used where necessary, for example, lactones such as δ-butyrolactone, ε-caprolactone and the like; various saturated or unsaturated fatty acids as modifier, such as coconut oil fatty acid, tung oil fatty acid, soybean oil fatty acid, linseed oil fatty acid and the like; Cardura E 10P (tradename, monoepoxide having branched alkyl, Japan Epoxy Resin Co.) and the like can be used, which can be used either singly or in combination of two or more.

In the polyester resin, introduction of carboxyl groups can be effected by, for example, concurrently using, in the occasion of dehydrative condensation, polybasic acid such as trimellitic acid or pyromellitic acid having at least 3 carboxyl groups per molecule, as a part of the polyvalent carboxylic acid component; or by half ester addition of dicarboxylic acid to hydroxyl groups in hydroxyl-containing polyester resin. Introduction of hydroxyl groups can be conducted in the occasion of preparing the polyester resin, by concurrent use of polyhydric alcohol having at least 3 hydroxyl groups per molecule, such as glycerine, trimethylolpropane and the like, as a part of the polyhydric alcohol.

Polyester resin can be rendered water-dispersible by neutralization of carboxyl groups in the resin with above-described basic substance. The neutralization preferably is conducted before its mixing with the curing agent (b), etc.

As the curing agent, (b), those known per se, for example, amino resin, blocked polyisocyanate compound and the like can be used, use of amino resin being preferred.

As the amino resin, for example, partially or wholly methylolated amino resin obtainable through reaction of an amino component such as melamine, urea, benzoguanamine, acetoguanamine, steroguanamine, spiroguanamine, dicyandiamide and the like with aldehyde can be named. As the aldehyde, formaldehyde, paraformaldehyde, acetaldehyde, benzaldehyde and the like can be named. Also such methylolated amino resin whose methylol groups are partially or completely etherified with suitable alcohol can be used, and as the alcohol useful for the etherification, for example, methyl alcohol, ethyl alcohol, n-propyl alcohol, i-propyl alcohol, n-butyl alcohol, i-butyl alcohol, 2-ethylbutanol, 2-ethylhexanol and the like may be named.

As the amino resin, melamine resin is preferred. In particular, at least one alkyl-etherified melamine resin selected from the group consisting of methyl-etherified melamine resin, butyl etherified melamine resin and methyl-butyl-mixed-etherified melamine resin is preferred, which are obtained by partially or completely etherifying methylol groups in methylolated melamine resin with methyl alcohol, butyl alcohol, or methyl alcohol and butyl alcohol, respectively.

The melamine resin to be blended with each of effect pigment-containing water-borne base coating compositions (A1) and (A2) may be the same or different. As the melamine resin which can be blended with the effect pigment-containing water-borne base coating composition (A1), one having weight-average molecular weight ($M_{A1}$) within a range of 800-5,000, in particular, 1,000-4,000 is preferred, and as that to be blended with the effect pigment-containing water-borne base coating composition (A2), one having weight-average molecular weight ($M_{A2}$) within a range of 400-4,000, in particular, 600-3,000 is preferred.

It is furthermore preferred for the melamine resin to be blended with the effect pigment-containing water-borne base coating composition (A1) to have a weight-average molecular weight ($M_{A1}$) greater than that ($M_{A2}$) of the melamine resin blended with the effect pigment-containing water-borne base coating composition (A2) by 300-4,000, in particular, by 600-3,000, as such enables provision of brilliant coating film of excellent brilliance.

That is, use of an effect pigment-containing water-borne base coating composition (A1) which contains an alkyl etherified melamine resin having a relatively large weight-average molecular weight and hence having a relatively high viscosity rise rate at the heat-curing time, in the first stage of the method of this invention, is effective for preventing inter-layer mingling at the interface of the first base coating film with the second base coating film. Furthermore, use of an effect pigment-containing water-borne base coating composition (A2) which contains an alkyl etherified melamine resin having relatively low weight-average molecular weight and hence having a relatively low viscosity rise rate at the heat-curing time in the second stage, can improve-fluidability of the effect pigment in the second base coating film during the time from its application to curing and facilitates parallel orientation of the effect pigment to the substrate. Thus a brilliant base coating film can be formed.

When at least one alkyl etherified melamine resin selected from the group consisting of methyl etherified melamine resin, butyl etherified melamine resin and methyl-butyl mixed etherified melamine resin is used as the melamine resin to be blended with such effect pigment-containing water-borne base coating composition (A1) and effect pigment-containing water-borne base coating composition (A2), preferably the molar ratio $R_{A1}$ (mol %) of the butyl group to the sum of mol numbers of methyl and butyl groups in the alkyl etherified melamine resin to be blended in the effect pigment-containing water-borne base coating composition (A1) is greater than the molar ratio $R_{A2}$ (mol %) of the butyl group to the sum of mol numbers of methyl and butyl groups in the alkyl etherified melamine resin to be blended in the effect pigment-containing water-borne base coating composition (A2), by at least 30. Whereby brilliant base coating film excellent in brilliance can be obtained. It is particularly preferred that the alkyl etherified melamine resin which is blended in the effect pigment-containing water-borne base coating composition (A1) is a methyl-butyl mixed etherified melamine resin and/or a butyl etherified melamine resin, and the alkyl etherified melamine-resin to be blended in the effect pigment-containing water-borne base coating composition (A2) is a methyl etherified melamine resin.

That is, by using in the first stage of the method of the present invention an effect pigment-containing water-borne base coating composition (A1) which contains an alkyl etherified melamine resin having a relatively large molar ratio $R_{A1}$ (mol %) of the butyl group to the sum of mol numbers of methyl and butyl groups and hence presumably having relatively high hydrophobicity, and by using in the second stage of the method of the present invention an effect pigment-containing water-borne base coating composition (A2) which contains an alkyl etherified melamine resin having a relatively small molar ratio $R_{A2}$ (mol %) of the butyl group to the sum of mol numbers of methyl and butyl groups and hence presumably having relatively high hydrophilicity, inter-layer mingling at the interface of the first base coating film and the second base coating film can be prevented and a brilliant base coating film having excellent brilliance can be formed.

In the present specification, the molar ratio $R_A$ (mol %) of butyl group to the sum of methyl and butyl groups in an alkyl etherified melamine resin is the molar ratio (mol %) of butyl alcohol to the sum of mol numbers of methyl alcohol and butyl alcohol which are used in the occasion of etherifying said methylolated amino resin. In the case of a methyl etherified melamine resin, the molar ratio $R_A$ (mol %) of butyl group to the sum of mol numbers of methyl and butyl groups is 0, and in the case of a butyl etherified melamine resin, the molar ratio $R_A$ (mol %) of butyl group to the sum of mol numbers of methyl and butyl groups is 100.

As blocked polyisocyanate compound which can be used as the curing agent (b), for example, polyisocyanate compounds having at least two isocyanate groups per molecule, whose isocyanate groups are blocked with a blocking agent such as oxime, phenol, alcohol lactam, mercaptan, pyrazole and the like, can be named.

The ratio between the contents of such main resin (a) and curing agent (b) in the effect pigment-containing water-borne base coating compositions useful for the present invention preferably lies within a range of 50-90 mass %, in particular, 60-85 mass %, of the former and 10-50 mass %, in particular, 15-40 mass %, of the latter, based on the total solid contents of the two components.

Effect pigment (c) encompasses pigments which impart to coating films glittering brilliance or interference of light rays, and which preferably are flaky or laminar. As effect pigment (c), for example, aluminum flake pigment, vapor-deposited aluminum flake pigment, metal oxide-coated aluminum flake pigment, colored aluminum flake pigment, mica, titanium oxide-coated mica, iron oxide-coated mica, micaceous iron oxide, titanium oxide-coated silica, titanium oxide-coated alumina, iron oxide-coated silica, iron oxide-coated alumina and the like can be named, which can be used either singly or in combination of two or more.

Effect pigment (c) preferably has an average particle diameter within a range of 3-30 μm, in particular, 5-25 μm. In the present specification, average particle diameter of effect pigment (c) is median size (d 50) in volumetric particle size distribution as measured by laser diffraction scattering method, which can be measured, for example, with a microtrack particle size distribution measuring device "MT3300" (tradename, NIKKSO Co., Ltd.)

Those effect pigments (c) are also preferably given in advance a dispersing treatment with a treating agent containing phospho groups or sulfo groups, for suppressing hydrogen gas generation. As phospho or sulfo group-containing treating agent, per se known low molecular compound or polymer can be used.

Effect pigment-containing water-borne base coating compositions to be used in the present invention contain such effect pigment (c) normally within a range of 2-50 mass parts, in particular, 5-40 mass parts, inter alia 10-35 mass parts, per 100 mass parts of combined solid contents of main resin (a) and curing agent (b).

Effect pigment-containing water-borne base coating composition (A1) preferably contains, in addition to the effect pigment, inorganic fine particles having an average primary particle diameter of not more than 1 μm, in particular, 0.001-0.8 μm, inter alia, 0.01-0.08 μm. The average primary particle diameter of inorganic fine particles as referred to in this invention is an average value of maximum diameters of 20 inorganic fine particles present on a straight line drawn at random on an electronmicrograph of each sample inorganic fine particulate powder as observed on scanning type electron microscope.

When effect pigment-containing water-borne base coating composition (A1) contains such inorganic fine particles, inter-layer mingling at the interface of the first base coating film and second base coating film is more completely prevented to decrease disturbance in effect pigment's orientation in the vicinity of the interface, and achieves the effect of enabling formation of coating film excelling in brilliance. The mechanism of achieving such an effect is yet unclear, but it is presumed that the inorganic fine particles contained in effect pigment-containing water-borne base coating composition (A1) suppress penetration and migration of water from the second base coating film to the first base coating film in the occasion of applying an effect pigment-containing water-borne base coating composition (A2) to form the second base coating film on the first base coating film formed with such a composition (A1), and in consequence suppress inter-layer mingling at the interface of the first and second base coating films to reduce disturbance in effect pigments' orientation in the vicinity of the interface and to form a coating film excelling in brilliance.

Again in effect pigment-containing water-borne base coating composition (A1), the pigment mass concentration (%) of the inorganic fine particles preferably lies within a range of 2-30, in particular, 5-20, inter alia, 7-17. In this specification, pigment mass concentration (%) of inorganic fine particles signifies the mass ratio of inorganic fine particles to the solid content of the coating composition.

As inorganic fine particles which can be contained in effect pigment-containing water-borne base coating composition (A1), for example, barium sulfate, barium carbonate, calcium carbonate, aluminum silicate, titanium oxide, silica, magnesium carbonate, talc, alumina white and the like can be named. Of those, barium sulfate, calcium carbonate and silica, inter alia, barium sulfate, are preferred.

As the barium sulfate, normally one having an average primary particle diameter within a range of 0.001-0.8 μm, in particular, 0.01-0.08 μm is preferred.

While effect pigment-containing water-borne base coating composition (A2) in general preferably contains no inorganic fine particles, it may contain inorganic fine particles, in particular, barium sulfate fine particles, at a pigment mass concentration (%) preferably less than 25, in particular, within a range of 0.1-15, inter alia, 1-6. In that case, preferably the pigment mass concentration (%) of barium sulfate fine particles in effect pigment-containing water-borne base coating composition (A1) is made higher than that of barium sulfate fine particles contained in effect pigment-containing water-borne base coating composition (A2) by at least 5, in particular, by 10-20. Where the first base coating film positioned at the underlayer side of base coating film contains relatively larger amount of barium sulfate fine particles compared to the second base coating film, inter-layer mingling at the interface of the first and second base coating films can be effectively prevented.

Effect pigment-containing water-borne base coating compositions to be used in the method of this invention may further contain, besides above effect pigment (c), where necessary, pigment such as coloring pigment, extender pigment and the like.

As coloring pigment, for example, white pigment such as titanium dioxide, black pigment such as carbon black, acetylene black, lamp black, bone black, graphite, black iron, aniline black and the like; yellow pigment such as yellow iron oxide, Titan Yellow, monoazo yellow, condensed azo yellow, azomethine yellow, bismuth vanadate, benzimidazole, isoindolinone, isoindoline, quinophtalone, benzidine yellow, Permanent Yellow and the like; orange pigment such as Permanent Orange; red pigment such as red iron oxide, Naphthol AS-azo red, anthanthrone, Anthraquinonyl Red, perilene maroon, quinacridone red pigment, diketopyrrolopyrrole, Watching Red, Permanent Red and the like; violet pigment such as cobalt violet, quinacridone violet, dioxazine violet and the like; blue pigment such as cobalt blue, phthalocyanine blue, threne blue and the like; and green pigment such as phthalocyanine green and the like can be named. As extender pigment, for example barium sulfate, barium carbonate, calcium carbonate, aluminum silicate, gypsum, clay, silica, white carbon, diatomaceous earth, talc, magnesium carbonate, alumina white, Gloss White, mica powder and the like can be named.

Effect pigment-containing water-borne base coating compositions can furthermore be blended with other paint additives which are customarily used for formulation of water-borne paint, such as ultraviolet absorber, light stabilizer, surface treating agent, fine polymer particles, basic neutralizer, antiseptic agent, antirusting agent, silane coupling agent, pigment dispersant, antiprecipitant, thickener, defoaming agent, curing catalyst, water, organic solvent and the like.

Effect pigment-containing water-borne base coating composition (A1) can have solid content of generally 15-45 mass %, preferably 20-39 mass %, inter alia, 25-35 mass %; and effect pigment-containing water-borne base coating composition (A2) can have a solid content of generally 5-30 mass %, preferably 6-15 mass %, inter alia, 7-9 mass %. Furthermore, the ratio of solid content ($S_{A1}$) of effect pigment-containing water-borne base coating composition (A1) to solid content ($S_{A2}$) of effect pigment-containing water-borne base coating composition (A2), $S_{A1}/S_{A2}$, is normally within a range of 1.5/1-5/1, preferably 2.6/1-4.5/1, inter alia 3/1-4/1. It is particularly advantageous that the solid content ($S_{A1}$) of effect pigment-containing water-borne base coating composition (A1) is within a range of 20-39 mass %, the solid content ($S_{A2}$) of effect pigment-containing water-borne base coating composition (A2) is 7-9 mass %, and the ratio of $S_{A1}/S_{A2}$ is within a range of 2.6/1-4.5/1.

In the present specification, solid content of an effect pigment-containing water-borne base coating composition is the mass ratio of non-volatile component remaining after drying the effect pigment-containing water-borne base coating composition at 110° C. for an hour, which can be calculated by measuring out about 2 g of the effect pigment-containing water-borne base coating composition into an aluminum foil cup of about 5 cm in diameter, spreading it well over the whole bottom area of the cup, drying it at 110° C. for an hour and determining its mass before and after the drying.

On the second base coating film formed as above, a clear coating composition can be applied as aforesaid. Such a clear coating composition can be applied onto heat-cured two coating films of the first and second base coating compositions and then heat-cured, but generally it is preferred to apply it on uncured second base coating film and heat-cure the first base coating film, the second coating film and the clear coating film simultaneously.

So formed coating film can be generally cured by heating at about 100-about 180° C., preferably about 120-about 160° C., for about 10-40 minutes, whereby providing a multi-layered coating film excelling in appearance (e.g., high color appearance, high gloss and surface smoothness).

As the clear coating composition, for example, those per se known and are customarily used for coating automobile bodies can be used. More specifically, for example, organic solvent-based thermosetting coating compositions, water-borne thermosetting coating compositions, thermosetting powder coating compositions and the like can be named, which contain main resin having crosslinking functional groups such as hydroxyl, carboxyl, epoxy, silanol and the like, such as acrylic resin, polyester resin, alkyd resin, urethane resin, epoxy resin, fluorinated resin and the like; and crosslinking agent as the vehicle component such as melamine resin, urea resin, optionally blocked polyisocyanate compound, carboxyl-containing compound or resin, epoxy-containing compound or resin and the like. Of these, organic solvent-based thermosetting coating composition or water-borne thermosetting coating composition containing carboxyl-containing resin and epoxy-containing resin are preferred. Clear coating composition may be in the form of one-package coating or two-package coating such as two-package type urethane resin coating composition.

The clear coating composition may also contain, to an extent not impairing its transparency, coloring pigment, effect pigment, dye and the like, and moreover suitably other additives such as extender pigment, ultraviolet absorber, defoaming agent, thickener, antirusting agent, surface-treating agent and the like.

Generally preferred thickness of the clear coating film is, in terms of dry film thickness, 0.15-60 μm, in particular, 20-50 μm, from the viewpoint of appearance of the coating film and coating operability.

EXAMPLES

Hereinafter the invention is explained more specifically, referring to working examples. The invention, however, is in no way limited by these working examples in which parts and percentages are by mass.

Production Examples of Acrylic Resin Emulsion (B)

Production Example 1

A reactor equipped with a thermometer, thermostat, stirrer, reflux condenser and dropping device was charged with 100 parts of deionized water and 0.5 part of AQUALON KH-10 (note 1), which were mixed by stirring in nitrogen gas current, and the temperature was raised to 80° C. Then 1% of the total amount of the following monomeric emulsion (1) and 10.3 parts of 3% aqueous ammonium persulfate solution were introduced into the reactor and kept at 80° C. for 15 minutes. Thereafter the rest of the monomeric emulsion (1) was dropped into the reactor over 3 hours, and aged for an hour after completion of the dropping. Then the monomeric emulsion (2) as specified in the following was dropped over 2 hours, followed by 1 hour's aging. Thereafter the reaction system was cooled to 30° C. while 42 parts of 5% aqueous 2-(dimethylamino)ethanol solution was slowly added to the reactor and the reaction product was discharged while being filtered with a 100-mesh nylon cloth, to provide an acrylic resin emulsion (B1) having an average particle diameter of 100 nm (as measured with a submicron particle size distribution measuring instrument, "COULTER N4 Model" (tradename, Beckmann-Coulter, Inc.) of a deionized water-diluted sample at 20° C.), acid value of 32 mgKOH/g, hydroxyl value of 43 mgKOH/g and solid content of 30%.

(note 1) AQUALON KH-10: tradename, polyoxyethylene alkyl ether sulfate ester ammonium salt, DAI-ICHI KOGYO SEIYAKU Co., Ltd.; active-ingredient, 97%

Monomeric emulsion (1): Monomeric emulsion (1) was obtained by mixing with stirring 56 parts of deionized water, 0.7 part of AQUALON KH-10, 3 parts of methylenebisacrylamide, 4 parts of styrene, 13 parts of methyl methacrylate, 30 parts of ethyl acrylate and 20 parts of n-butyl acrylate.

Monomeric emulsion (2); Monomeric emulsion (2) was obtained by mixing with stirring 24 parts of deionized water, 0.3 part of AQUALON KH-10, 0.03 part of ammonium persulfate, 3 parts of styrene, 6 parts of methyl methacrylate, 2 parts of ethyl acrylate, 4 parts of n-butyl acrylate, 10 parts of 2-hydroxyethyl acrylate and 5 parts of methacrylic acid.

Production Example 2

Production Example 1 was repeated except that the monomeric emulsion (1) was replaced with the following monomeric emulsion (3) and the monomeric emulsion (2), with the following monomeric emulsion (4), to provide an acrylic resin emulsion (B2) having an acid value of 44 mgKOH/g, hydroxyl value of 56 mgKOH/g and solid content of 30%.

Monomeric emulsion (3): Monomeric emulsion (3) was obtained by mixing with stirring 64 parts of deionized water, 0.8 part of AQUALON KH-10, 3 parts of methylenebisacrylamide, 2 parts of methacrylic acid, 5 parts of 2-hydroxyethyl acrylate, 4 parts of styrene, 12 parts of methyl methacrylate, 34 parts of ethyl acrylate and 20 parts of n-butyl acrylate.

Monomeric emulsion (4): Monomeric emulsion (4) was obtained by mixing with stirring 16 parts of deionized water, 0.2 part of AQUALON KH-10, 0.02 part of ammonium persulfate, 3 parts of styrene, 2 parts of ethyl acrylate, 2 parts of n-butyl acrylate, 8 parts of 2-hydroxyethyl acrylate and 5 parts of methacrylic acid.

Production Example 3

Production Example 1 was repeated except that the monomeric emulsion (1) was replaced with the following monomeric emulsion (5) and the monomeric emulsion (2), with the following monomeric emulsion (6), to provide an acrylic resin emulsion (B3) having an acid value of 19 mgKOH/g, hydroxyl value of 22 mgKOH/g and solid content of 30%.

Monomeric emulsion (5): Monomeric emulsion (5) was obtained by mixing with stirring 48 parts of deionized water, 0.6 part of AQUALON KH-10, 3 parts of acrylamide, 10 parts of styrene, 20 parts of methyl methacrylate and 27 parts of n-butyl acrylate.

Monomeric emulsion (6): Monomeric emulsion (6) was obtained by mixing with stirring 32 parts of deionized water, 0.4 part of AQUALON KH-10, 0.04 part of ammonium persulfate, 10 parts of methyl methacrylate, 10 parts of ethyl acrylate, 12 parts of n-butyl acrylate, 5 parts of 2-hydroxyethyl acrylate and 3 parts of methacrylic acid.

Production Examples of Acrylic Resin Solution

Production Example 4

A reactor equipped with a thermometer, thermostat, stirrer, reflux condenser and dropping device was charged with 35 parts of ethylene glycol monobutyl ether whose temperature was then raised to 100° C. under stirring. Then a mixture of 30 parts of N-butyl acrylate, 17 parts of methyl methacrylate, 30 parts of 2-ethylhexyl methacrylate, 5 parts of styrene, 10 parts of 2-hydroxyethyl methacrylate, 8 parts of methacrylic acid and 1 part of azobisisobutyronitrile was dropped at a uniform rate over 4 hours with a dropping pump, while the temperature of 100° C. was maintained. After completion of the dropping, the temperature was maintained at 100° C. for a further hour, and stirring was continued. Then a solution of 0.5 part of 2,2'-azobis(2,4-dimethylvaleronitrile) as dissolved in 10 parts of ethylene glycol monobutyl ether was dropped at a uniform rate over an hour. Further maintaining the reaction system at 115° C. for an hour, an acrylic resin solution was obtained. After the end of the reaction, the solution was neutralized with the equivalent amount of 2-(dimethylamino) ethanol, and ethylene glycol monobutyl ether was added to provide an acrylic resin solution having a solid content of 55%.

Formulation of Inorganic Fine Particle Dispersions (C)

Production Example 5

In a paint conditioner, 180 parts of the acrylic resin solution as obtained in Production Example 4, 360 parts of deionized water, 6 parts of SURFYNOL 104 A (tradename; Air Products and Chemicals, Inc. a defoaming agent, solid content: 50%) and 250 parts of BARIFINE™ BF-20 (tradename; Sakai Chemical Industry Co. Ltd., barium sulfate powder, average primary particle diameter: 0.03 μm) were mixed and dispersed at room temperature for an hour with addition of glass beads medium, to provide an inorganic fine particle dispersion (C1) having a particle size not greater than 10 μm.

Production Example 6

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of NEOLITE SP-300 (tradename; Takehara Kagaku Kogyo Co., Ltd., calcium carbonate powder, average primary particle diameter: 0.15 μm) were mixed and dispersed at room temperature for an hour with addition of glass beads medium, to provide an inorganic fine particle dispersion (C2) having a particle size not greater than 10 μm.

Production Example 7

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of NEOLITE™ SP (Takehara Kagaku Kogyo Co., Ltd., calcium carbonate powder, average primary particle diameter: 0.08 μm) were mixed and dispersed at room temperature for an hour with addition of glass beads medium, to provide an inorganic fine particle dispersion (C3) having a particle size not greater than 10 μm.

Production Example 8

In a paint conditioner, 180 parts of the acrylic resin solution as obtained in Production Example 4, 360 parts of deionized water, 6 parts of SURFYNOL 104 A (Air Products and Chemicals, Inc., a defoaming agent, solid content: 50%) and 250 parts of AEROSIL 200 (tradename; Nippon Aerosil Co., Ltd, silica powder, average primary particle diameter: 0.12 μm) were mixed and dispersed at room temperature for an hour with addition of glass beads medium, to provide an inorganic fine particle dispersion (C4) having a particle size not greater than 10 μm.

Production Example 9

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of AEROSIL 380 (tradename, Nippon Aerosil Co., Ltd, silica powder, average primary particle diameter: 0.07 μm) were mixed and dispersed at room temperature for an hour with addition of glass beads medium, to provide an inorganic fine particle dispersion (C5) having a particle size not greater than 10 μm.

Production Example 10

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of MT-700HD (tradename; TAYCA Corporation, titanium oxide powder, average primary particle diameter: 0.05 μm) were mixed and dispersed at room temperature for an hour with addition of glass beads medium, to provide an inorganic fine particle dispersion (C6) having a particle size not greater than 10 μm.

Production Example 11

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of SPARWITE W-5HB (tradename; Wilbur-Ellis Co., barium sulfate powder, average primary particle diameter: 1.6 μm) were mixed and dispersed at room temperature for an hour with addition of glass beads medium, to provide an inorganic fine particle dispersion (C7) having a particle size not greater than 10 μm.

Production Example 12

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of SACHTLEBEN MICRO (tradename; Wilbur-Ellis Co., barium sulfate powder, average primary particle diameter: 0.7 μm) were mixed and dispersed at room temperature for an hour with addition of glass beads medium, to provide an inorganic fine particle dispersion (C8) having a particle size not greater than 10 μm.

Production Example 13

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of BARIACE B-34 (tradename; Sakai Chemical Industry Co., Ltd., barium sulfate powder, average primary particle diameter: 0.3 μm) were mixed and dispersed at room temperature for an hour with addition of glass beads medium, to provide an inorganic fine particle dispersion (C9) having a particle size not greater than 10 μm.

Production Example 14

In a paint conditioner, 180 parts of the acrylic resin solution as obtained in Production Example 4, 360 parts of deionized water, 6 parts of SURFYNOL 104 A (tradename; Air Products and Chemicals, Inc., a defoaming agent, solid content: 50%) and 250 parts of BARIFINE BF-1 (tradename; Sakai Chemical Industry Co., Ltd., barium sulfate powder, average primary particle diameter: 0.05 μm) were mixed and dispersed at room temperature for an hour with addition of glass beads medium, to provide an inorganic fine particle dispersion (C10) having a particle size not greater than 10 μm.

Formulation of Aluminum Pigment Paste Concentrate (D)

Production Example 15

An agitation-mixing vessel was charged with a mixed solvent of 10 parts of ethylene glycol monobutyl ether and 25 parts of octanol, to which 20 parts of an aluminum pigment paste "GX-180A (tradename; Asahi Kasei Metals Co., Ltd., metal content: 74%) and 6 parts of phospho group-containing resin solution(note 2) were added and mixed by stirring to provide an aluminum pigment paste concentrate (D1).

(note 2) Phospho group-containing resin solution:

A reactor equipped with a thermometer, thermostat, stirrer, reflux condenser and a dropping device was charged with a mixed solvent of 27.5 parts of methoxypropanol and 27.5 parts of isobutanol, heated to 110° C., and 121.5 parts of a mixture composed of 25 parts of styrene, 27.5 parts of n-butyl methacrylate, 20 parts of "Isostearyl Acrylate" (tradename, Osaka Organic Chemical Industry Co., Ltd., a branched higher alkyl acrylate), 7.5 parts of 4-hydroxybutyl acrylate, 15 parts of phospho group-containing polymerizable monomer(note 3), 12.5 parts of 2-methacryloyloxyethyl acid phosphate, 10 parts of isobutanol and 4 parts of t-butyl peroxyoctanoate was added to the mixed solvent consuming 4 hours. Further, a mixture of 0.5 part of t-butyl peroxyoctanoate and 20 parts of isopropanol was dropped over an hour. Thereafter the reaction system was stirred and aged for an hour to provide a phospho group-containing resin solution having a solid content of 50%. The acid value of this resin attributable to the phospho groups was 83 mgKOH/g, the hydroxyl value attributable to 4-hydroxybutyl acrylate was 29 mgKOH/g, and the weight-average molecular weight was 10,000.

(note 3) Phospho group-containing polymerizable monomer

A reactor equipped with a thermometer, thermostat, stirrer, reflux condenser and a dropping device was charged with 57.5 parts of monobutylphosphoric acid and 41.1 parts of isobutanol, and into which 42.5 parts of glycidyl methacrylate was dropped while passing air over 2 hours, followed by an hour's stirring and aging. Then 59 parts isopropanol was added to provide a phospho group-containing polymerizable monomer solution having a solid content of 50%. Its acid value attributable to the phospho groups was 285 mgKOH/g.

Production Example 16

An agitation-mixing vessel was charged with a mixed solvent of 10 parts of ethylene glycol monobutyl ether and 25 parts of octanol, into which 40 parts of an aluminum pigment paste "GX-180A" (Asahi Kasei Metals Co., Ltd, metal content; 74%) and 12 parts of the phospho group-containing resin solution were added, and mixed and stirred to provide an aluminum pigment paste concentrate (D2).

Preparation of Effect Pigment-Containing Water-Borne Base Coating Compositions (A1)

Production Example 17

Into an agitation-mixing vessel 61 parts of the aluminum pigment paste concentrate (D1) as obtained in Production Example 15 was thrown, and while stirring the same, 43 parts of melamine resin (E1) (a methyl-butyl mixed etherified melamine resin, weight-average molecular weight: 2,000; molar ratio of butyl group to the sum of mol numbers of methyl and butyl groups: 50 mol %; solid content: 70%) was added. Further continuing the stirring, 32 parts of the inorganic fine particle dispersion (C1) as obtained in Production Example 5 and 233 parts of the acrylic resin emulsion (B1) as obtained in Production Example 1 were added to the reactor and mixed. Adding 2-(dimethylamino)ethanol and deionized water to the resulting mixture and where necessary adjusting viscosity of the system with addition of SN Thickener 660T (tradename, SAN NOPCO Ltd., a urethane-associated thickener), an effect pigment-containing water-borne base coating composition (A1-1) of pH 8.0, having a solid content of 35% and a viscosity ($V_{A1}$) after 1 minute of application of 550 Pa·sec was obtained.

Production Examples 18-44

Using the kind and amount as indicated in the following Table 1 of acrylic resin emulsions, inorganic fine particle dispersions, aluminum pigment paste concentrates and melamine resins, and operating similarly to Production Example 17, effect pigment-containing water-borne base coating compositions (A1-2) to (A1-28) were obtained, each having the solid content and viscosity ($V_{A1}$) after 1 minute of application as indicated in the following Table 1.

TABLE 1

| Production Example | Coating composition | Acrylic resin emulsion (B) | | | Inorganic fine particle dispersion (C) | | | | | | | | | | aluminum pigment paste concentrate (D) | Melamine resin (E) | | | | Solid content of coating composition | Viscosity ($V_{A1}$) after 1 minute of application |
|---|---|---|---|---|---|---|---|---|---|---|---|---|---|---|---|---|---|---|---|---|---|
| | | B1 | B2 | B3 | C1 | C2 | C3 | C4 | C5 | C6 | C7 | C8 | C9 | C10 | D1 | E1 | E2 (note 4) | E3 (note 5) | E4 (note 6) | [%] | [Pa · sec] |
| 17 | A1-1 | 233 | | | 32 | | | | | | | | | | 61 | 43 | | | | 35 | 550 |
| 18 | A1-2 | 233 | | | 32 | | | | | | | | | | 61 | 43 | | | | 34 | 450 |
| 19 | A1-3 | 233 | | | 32 | | | | | | | | | | 61 | 43 | | | | 33 | 240 |
| 20 | A1-4 | 233 | | | 32 | | | | | | | | | | 61 | 43 | | | | 31 | 200 |
| 21 | A1-5 | 233 | | | 32 | | | | | | | | | | 61 | 43 | | | | 29 | 150 |
| 22 | A1-6 | | 233 | | 32 | | | | | | | | | | 61 | 43 | | | | 29 | 149 |
| 23 | A1-7 | | | 233 | 32 | | | | | | | | | | 61 | 43 | | | | 30 | 151 |
| 24 | A1-8 | 233 | | | 32 | | | | | | | | | | 61 | 43 | | | | 28 | 80 |
| 25 | A1-9 | 233 | | | 32 | | | | | | | | | | 61 | 43 | | | | 27 | 50 |
| 26 | A1-10 | 233 | | | 32 | | | | | | | | | | 61 | 43 | | | | 26 | 20 |
| 27 | A1-11 | 233 | | | 32 | | | | | | | | | | 61 | 43 | | | | 25 | 9 |
| 28 | A1-12 | 233 | | | | | | | | | | | | | 61 | 43 | | | | 27 | 79 |
| 29 | A1-13 | 233 | | | | 32 | | | | | | | | | 61 | 43 | | | | 29 | 79 |
| 30 | A1-14 | 233 | | | | | 32 | | | | | | | | 61 | 43 | | | | 29 | 79 |
| 31 | A1-15 | 233 | | | | | | 32 | | | | | | | 61 | 43 | | | | 28 | 81 |
| 32 | A1-16 | 233 | | | | | | | 32 | | | | | | 61 | 43 | | | | 28 | 81 |
| 33 | A1-17 | 233 | | | | | | | | 32 | | | | | 61 | 43 | | | | 30 | 79 |
| 34 | A1-18 | 233 | | | | | | | | | 32 | | | | 61 | 43 | | | | 29 | 79 |
| 35 | A1-19 | 233 | | | | | | | | | | 32 | | | 61 | 43 | | | | 29 | 80 |
| 36 | A1-20 | 233 | | | | | | | | | | | 32 | | 61 | 43 | | | | 28 | 81 |
| 37 | A1-21 | 233 | | | | | | | | | | | | 32 | 61 | 43 | | | | 28 | 80 |
| 38 | A1-22 | 233 | | | 144 | | | | | | | | | | 61 | 43 | | | | 31 | 79 |

TABLE 1-continued

| Production Example | Coating composition | Acrylic resin emulsion (B) B1 | B2 | B3 | Inorganic fine particle dispersion (C) C1 | C2 | C3 | C4 | C5 | C6 | C7 | C8 | C9 | C10 | aluminum pigment paste concentrate (D) D1 | Melamine resin (E) E1 | E2 (note 4) | E3 (note 5) | E4 (note 6) | Solid content of coating composition [%] | Viscosity ($V_{A1}$) after 1 minute of application [Pa · sec] |
|---|---|---|---|---|---|---|---|---|---|---|---|---|---|---|---|---|---|---|---|---|---|
| 39 | A1-23 | 233 | | | 96 | | | | | | | | | | 61 | 43 | | | | 30 | 80 |
| 40 | A1-24 | 233 | | | 64 | | | | | | | | | | 61 | 43 | | | | 29 | 81 |
| 41 | A1-25 | 233 | | | 16 | | | | | | | | | | 61 | 43 | | | | 28 | 80 |
| 42 | A1-26 | 233 | | | 32 | | | | | | | | | | 61 | | 43 | | | 28 | 80 |
| 43 | A1-27 | 233 | | | 32 | | | | | | | | | | 61 | | | 43 | | 28 | 79 |
| 44 | A1-28 | 233 | | | 32 | | | | | | | | | | 61 | | | | 43 | 28 | 79 |

(note 4) Melamine resin (E2): a methyl-butyl mixed etherified melamine resin; weight-average molecular weight, 2,000; molar ratio of butyl groups to the sum of mol numbers of methyl and butyl groups: 70 mol %; solid content: 70%.

(note 5) Melamine resin (E3): a methyl-butyl mixed etherified melamine resin; weight-average molecular weight, 1,500; molar ratio of butyl groups to the sum of mol numbers of methyl and butyl groups: 70 mol %; solid content: 70%.

(note 6) Melamine resin (E4): a methyl-butyl mixed etherified melamine resin; weight-average molecular weight, 1,200; molar ratio of butyl groups to the sum of mol numbers of methyl and butyl groups, 70 mol %; solid content, 70%.

Preparation of Effect Pigment-Containing Water-Borne Base Coating Composition (A2)

Production Example 45

Into an agitation-mixing vessel, 87 parts of the aluminum pigment paste concentrate (D2) as obtained in Production Example 16 was thrown, and while stirring the same, 38 parts of melamine resin (E5) (a methyl-etherified melamine resin; weight-average molecular weight: 800; molar ratio of butyl group to the sum of mol numbers of methyl and butyl groups: 0 mol %; solid content: 80%) was added. Further continuing the stirring, 233 parts of the acrylic resin emulsion (B1) as obtained in Production Example 1 was added to the reactor and mixed. Adding PRIMAL ASE-60 (tradename: Rohm & Haas Co., a polyacrylic acid thickener), 2-(dimethylamino) ethanol and deionized water to the resulting mixture, an effect pigment-containing water-borne base coating composition (A2-1) of pH 8.0, having a solid content of 9% and a viscosity (VA after 1 minute of application of 20 Pa·sec was obtained.

Production Examples 46-62

Using the kind and amount as indicated in the following Table 2 of acrylic resin emulsions, inorganic fine particle dispersions, aluminum pigment paste concentrates and melamine resins, and operating similarly to Production Example 45, effect pigment-containing water-borne base coating compositions (A2-2) to (A2-18) were obtained, each having the solid content and viscosity ($V_{A2}$) after 1 minute of application as indicated in the following Table 2.

Production Example 63

Into an agitation-mixing vessel, 87 parts of the aluminum pigment paste concentrate (D2) as obtained in Production Example 16 was thrown, and while stirring the same, 38 parts of the melamine resin (E5) was added. Further continuing the stirring, 74 parts of the inorganic fine particle dispersion (C1) as obtained in Production Example 5 and 233 parts of the acrylic resin emulsion (B1) as obtained in Production Example 1 were added to the reactor and mixed. Adding PRIMALASE-60, 2-(dimethylamino)ethanol and deionized water to the resulting mixture, an effect pigment-containing water-borne base coating composition (A2-19) of pH 8.0, having a solid content of 9% and a viscosity ($V_{A2}$) after 1 minute of application of 20 Pa·sec was obtained.

Production Example 64

Production Example 63 was repeated except that 74 parts of the inorganic fine particle dispersion (C1) was replaced with 32 parts of the same dispersion (C1), to provide an effect pigment-containing water-borne base coating composition (A2-20) of pH 8.0, having a solid content of 9% and a viscosity ($V_{A2}$) after 1 minute of application of 20 Pa·sec.

Production Example 65

Into an agitation-mixing vessel, 87 parts of the aluminum pigment paste concentrate (D2) as obtained in Production Example 16 was thrown, and while stirring the same, 38 parts of the melamine resin (E5) was added. Further continuing the stirring, 233 parts of the acrylic resin emulsion (B1) as obtained in Production Example 1 was added to the reactor and mixed. Adding SN Thickener 660T (tradename: SAN NOPCO Ltd., a urethane-associated thickener), 2-(dimethylamino)ethanol and deionized water to the resulting mixture, an effect pigment-containing water-borne base coating composition (A2-21) of pH 8.0, having a solid content of 9% and a viscosity ($V_{A2}$) after 1 minute of application of 20 Pa·sec was obtained.

Production Example 66

Into an agitation-mixing vessel, 87 parts of the aluminum pigment paste concentrate (D2) as obtained in Production Example 16 was thrown, and while stirring the same, 38 parts of the melamine resin (E5) was added. Further continuing the stirring, 16 parts of the inorganic fine particle dispersion (C1) as obtained in Production Example 5 and 233 parts of the acrylic resin emulsion (B1) as obtained in Production Example 1 were added to the reactor and mixed. Adding SN Thickener 660T (tradename, SAN NOPCO Ltd., a urethane-associated thickener), 2-(dimethylamino)ethanol and deionized water to the resulting mixture, an effect pigment-containing water-borne base coating composition (A2-22) of pH 8.0, having a solid content of 9% and a viscosity ($V_{A2}$) after 1 minute of application of 20 Pa·sec was obtained.

TABLE 2

| Production Example | Coating composition | Acrylic resin emulsion (B) B1 | B2 | B3 | Inorganic fine particle dispersion (C) C1 | aluminum pigment paste concentrate (D) D2 | Melamine resin (E) E5 | E6 (note 7) | E7 (note 8) | Solid content of coating composition [%] | Viscosity ($V_{A2}$) after 1 minute of application [Pa · sec] |
|---|---|---|---|---|---|---|---|---|---|---|---|
| 45 | A2-1 | 233 | | | | 87 | 38 | | | 9 | 20 |
| 46 | A2-2 | | 233 | | | 87 | 38 | | | 9 | 20 |
| 47 | A2-3 | | | 233 | | 87 | 38 | | | 9 | 20 |
| 48 | A2-4 | 233 | | | | 87 | 38 | | | 9 | 12 |
| 49 | A2-5 | 233 | | | | 87 | 38 | | | 9 | 220 |
| 50 | A2-6 | 233 | | | | 87 | 38 | | | 9 | 180 |
| 51 | A2-7 | 233 | | | | 87 | 38 | | | 9 | 100 |
| 52 | A2-8 | 233 | | | | 87 | 38 | | | 9 | 80 |
| 53 | A2-9 | 233 | | | | 87 | 38 | | | 9 | 50 |
| 54 | A2-10 | 233 | | | | 87 | 38 | | | 9 | 30 |
| 55 | A2-11 | 233 | | | | 87 | 38 | | | 9 | 9 |
| 56 | A2-12 | 233 | | | | 87 | 38 | | | 9 | 6 |
| 57 | A2-13 | 233 | | | | 87 | 38 | | | 9 | 4 |
| 58 | A2-14 | 233 | | | | 87 | | 43 | | 9 | 20 |
| 59 | A2-15 | 233 | | | | 87 | | | 38 | 9 | 20 |
| 60 | A2-16 | 233 | | | | 87 | 38 | | | 17 | 20 |
| 61 | A2-17 | 233 | | | | 87 | 38 | | | 12 | 20 |
| 62 | A2-18 | 233 | | | | 87 | 38 | | | 12 | 4 |
| 63 | A2-19 | 233 | | | 74 | 87 | 38 | | | 9 | 20 |
| 64 | A2-20 | 233 | | | 32 | 87 | 38 | | | 9 | 20 |
| 65 | A2-21 | 233 | | | | 87 | 38 | | | 9 | 20 |
| 66 | A2-22 | 233 | | | 16 | 87 | 38 | | | 9 | 20 |

(note 7) Melamine resin (E6): a methyl-butyl mixed etherified melamine resin; weight-average molecular weight, 1,200; molar ratio of butyl groups to the sum of mol numbers of methyl and butyl groups: 30 mol %; solid content: 70%.

(note 8) Melamine resin (E7): a methyl-butyl mixed etherified melamine resin; weight-average molecular weight, 800; molar ratio of butyl groups to the sum of mol numbers of methyl and butyl groups, 50 mol %; solid content, 80%.

Production of Test Substrates

A 45 cm-long, 30 cm-wide and 0.8 mm-thick zinc phosphate-treated cold-drawn steel sheet was electrodeposition coated with ELECRON GT-10 (tradename, Kansai Paint Co., Ltd., a thermosetting epoxy resin cationic electrodeposition coating composition) to a dry film thickness of 20 μm, which was heated at 170° C. for 30 minutes and cured. Then an intermediate coating composition, AMILAC TP-65-2 (tradename, Kansai Paint, CO., Ltd., polyester resin-amino resin type organic solvent-based intermediate coating composition) was applied thereonto to a dry film thickness of 40 μm, which was cured by heating at 140° C. for 30 minutes, to provide a test substrate.

Example 1

In a coating environment of temperature 23° C. and humidity 75%, on the above-described test substrate and a 45 cm-long, 30 cm-wide and 0.8 mm-thick tin plate, the effect pigment-containing water-borne base coating compositions (A1-2) as obtained in Production Example 18 was applied with a rotary bell atomizer, ABB Cartridge Bell Coater (tradename, ABB Co.), under coating conditions of: the bell diameter, 77 mm; bell rotation number, 25,000 rpm; shaping air flow rate, 700 NL/min. and applied voltage, −60 kV; each to a dry film thickness as indicated in Table 3, to form first base coating film. After an interval of 1 minute; the first base coating film formed on the tin plate was taken by scratching with a spatula and sealed air-tightly in a container as the sample for measuring the viscosity ($V_{A3}$) of the first base coating film immediately before applying an effect pigment-containing water-borne base coating composition (A2). After taking the sample, on the first base coating film formed on the test substrate, the effect pigment-containing water-borne base coating composition (A2-1) as obtained in Production Example 45 was applied with a rotary bell atomizer, ABB Cartridge Bell Coater (tradename, ABB Co.), under coating conditions of: the bell diameter, 77 mm; bell rotation number, 25,000 rpm; shaping air flow rate, 700 NL/min.; and applied voltage, −60 kV; each to a dry film thickness as indicated in Table 3, to form second base coating film. After an interval of 2 minutes, the second base coating film was pre-heated at 80° C. for 3 minutes, and onto the uncured base coating film surface MAGICRON KINO-1210 (tradename, Kansai Paint Co., Ltd., acrylic resin organic solvent-based top clear coating composition) was applied to a dry film thickness of 40 μm. After an interval of 7 minutes, these coating films were simultaneously cured by heating at 140° C. for 30 minutes, to provide a test panel.

Examples 2-44 and Comparative Examples 1-7

Effect pigment-containing water-borne base coating compositions (A1-1) or (A1-3)-(A1-28) were coated in various combinations to dry film thicknesses as indicated in Table 3 to form each first base coating film, and thereafter effect pigment-containing water-borne base coating compositions (A2-1)-(A2-22) were applied to form second base coating films. Through operations identical with those in Example 1 in all other respects, test panels of Examples 2-44 and Comparative Examples 1-7 were prepared.

Evaluation Tests

Results of coating film performance tests of each of the test panels as obtained in above Examples 1-44 and Comparative Examples 1-7, and viscosity values ($V_{A3}$) of those first base coating films immediately before applying the effect pigment-containing water-borne base coating compositions (A2) were as shown in Table 3. The measuring method of the viscosity ($V_{A3}$) and the coating film performance test methods were as follows.

Viscosity ($V_{A3}$) of first base coating film immediately before applying effect pigment-containing water-borne base coating composition (A2): As to each sample for measuring viscosity ($V_{A3}$) of first base coating film immediately before applying effect pigment-containing water-borne base coating composition (A2), as taken as described in Example 1, the viscosity at 0.1 $sec^{-1}$ where the shear rate was varied from 10,000 $sec^{-1}$ to 0.001 $sec^{-1}$ at the measuring temperature of 23° C. was measured with a viscoelasticity measuring instrument, HAAKE RheoStress RS150 (tradename, HAAK Ltd.).

Flip-flop property: As to each test panel, L values (value) at receiving angles of 15° and 110° were measured with a multi-angle spectrophotometer MA-68 (tradename, X-Rite Co.) and its FF property was calculated according to the following equation:

$$FF\ \text{value}=L\ \text{value at receiving angle of } 15°/L\ \text{value at receiving angle of } 110°.$$

The greater the FF value, the greater the variation in L value (value) according to observation angle (receiving angle), indicating favorable FF property.

Brilliance: Each test panel was visually observed at varied observation angles, and the panel's brilliance was evaluated according to the following standard:

⊙: remarkable variation in metallic effect according to the angle of visual observation, excellent flip-flop property, nearly no metallic unevenness and very excellent brilliance ○: slight metallic unevenness recognizable but remarkable variation in metallic effect according to the angle of visual observation, excellent flip-flop property and good brilliance Δ: variation in metallic effect according to the angle of visual observation is moderate, flip-flop property slightly inferior and slightly inferior brilliance x: variation in metallic effect according to the angle of visual observation small, inferior flip-flop property and brilliance.

Surface smoothness: Appearance of each test panel was evaluated by visual observation:

⊙: very excellent surface smoothness

○: excellent surface smoothness

Δ: slightly inferior surface smoothness x: inferior surface smoothness

Initial adherability: Each of the multi-layered coating film on each test panel was incised with a cutter to the depth reaching the substrate, to make one-hundred (100) 2 mm×2 mm square incisions. An adhesive tape was stuck on the incised surface and then rapidly peeled off at 20° C. The number of square coating film remaining on each test panel was examined:

⊙: 100 squares remained, and the edges of incisions with the cutter were smooth

○: 100 square remained but minor peeling observed at the crossing points of the incisions with the cutter Δ: 99-81 squares remained x: 80 or less squares remained.

Water-resistant adherability: The test panels were immersed in 40° C. warm water for 10 days, withdrawn, dried at room temperature for 12 hours and were given the squares test similar to the above initial adherability test. The evaluation standard was same to that applied to the initial adherability test.

TABLE 3

| | | Effect pigment-containing water-borne base coating composition (A1) | | | Effect pigment-containing water-borne base coating composition (A2) | | | Viscosity ratio between composition (A1) and composition (A2) | Viscosity ($V_{A3}$) of first base coating film immediately before applying composition (A2) | | | | | |
|---|---|---|---|---|---|---|---|---|---|---|---|---|---|---|
| | | coating composition | Viscosity ($V_{A1}$) [Pa · sec] | Dry film thickness [μm] | coating composition | Viscosity ($V_{A2}$) [Pa · sec] | Dry film thickness [μm] | ($V_{A1}$)/($V_{A2}$) | [Pa · sec] | F/F property | Brilliance | Surface Smoothness | Initial adherability | Water-resistant adherability |
| Example | 1 | A1-2 | 450 | 12 | A2-1 | 20 | 3 | 22.5/1 | 450 | 5.5 | ○ | ○ | ⊙ | ⊙ |
| | 2 | A1-3 | 240 | 12 | A2-1 | 20 | 3 | 12/1 | 240 | 5.5 | ○ | ⊙ | ⊙ | ⊙ |
| | 3 | A1-4 | 200 | 12 | A2-1 | 20 | 3 | 10/1 | 200 | 5.5 | ○ | ⊙ | ⊙ | ⊙ |
| | 4 | A1-5 | 150 | 12 | A2-1 | 20 | 3 | 7.5/1 | 150 | 5.6 | ○ | ⊙ | ⊙ | ⊙ |
| | 5 | A1-6 | 149 | 12 | A2-2 | 20 | 3 | 7.5/1 | 149 | 5.5 | ○ | ⊙ | ⊙ | ⊙ |
| | 6 | A1-7 | 151 | 12 | A2-3 | 20 | 3 | 7.6/1 | 151 | 5.3 | ○ | ⊙ | ⊙ | ○ |
| | 7 | A1-8 | 80 | 12 | A2-1 | 20 | 3 | 4/1 | 80 | 5.6 | ⊙ | ⊙ | ⊙ | ⊙ |
| | 8 | A1-8 | 80 | 12 | A2-21 | 20 | 3 | 4/1 | 80 | 5.7 | ⊙ | ⊙ | ⊙ | ⊙ |
| | 9 | A1-9 | 50 | 12 | A2-1 | 20 | 3 | 2.5/1 | 50 | 5.4 | ⊙ | ⊙ | ⊙ | ⊙ |
| | 10 | A1-9 | 50 | 12 | A2-4 | 12 | 3 | 4.2/1 | 50 | 5.4 | ⊙ | ⊙ | ⊙ | ⊙ |
| | 11 | A1-10 | 20 | 12 | A2-4 | 12 | 3 | 1.7/1 | 20 | 4.3 | ○ | ⊙ | ⊙ | ⊙ |
| | 12 | A1-3 | 240 | 12 | A2-6 | 180 | 3 | 1.3/1 | 240 | 4.2 | ○ | ⊙ | ⊙ | ⊙ |
| | 13 | A1-3 | 240 | 12 | A2-7 | 100 | 3 | 2.4/1 | 240 | 4.6 | ○ | ⊙ | ⊙ | ⊙ |
| | 14 | A1-5 | 150 | 12 | A2-7 | 100 | 3 | 1.5/1 | 150 | 4.5 | ○ | ⊙ | ⊙ | ⊙ |
| | 15 | A1-5 | 150 | 12 | A2-8 | 80 | 3 | 1.9/1 | 150 | 4.9 | ○ | ⊙ | ⊙ | ⊙ |
| | 16 | A1-5 | 150 | 12 | A2-9 | 50 | 3 | 3/1 | 150 | 5.3 | ⊙ | ⊙ | ⊙ | ⊙ |
| | 17 | A1-8 | 80 | 12 | A2-9 | 50 | 3 | 1.6/1 | 80 | 5.1 | ⊙ | ⊙ | ⊙ | ⊙ |

TABLE 3-continued

| | | Effect pigment-containing water-borne base coating composition (A1) | | | Effect pigment-containing water-borne base coating composition (A2) | | | Viscosity ratio between composition (A1) and composition (A2) | Viscosity ($V_{A3}$) of first base coating film immediately before applying composition (A2) | | | | | |
|---|---|---|---|---|---|---|---|---|---|---|---|---|---|---|
| | | coating composition | Viscosity ($V_{A1}$) [Pa · sec] | Dry film thickness [μm] | coating composition | Viscosity ($V_{A2}$) [Pa · sec] | Dry film thickness [μm] | ($V_{A1}$)/($V_{A2}$) | [Pa · sec] | F/F property | Brilliance | Surface Smoothness | Initial adherability | Water-resistant adherability |
| | 18 | A1-8 | 80 | 12 | A2-10 | 30 | 3 | 2.7/1 | 80 | 5.6 | ⊙ | ⊙ | ⊙ | ⊙ |
| | 19 | A1-8 | 80 | 12 | A2-4 | 12 | 3 | 6.7/1 | 80 | 5.5 | ⊙ | ⊙ | ⊙ | ⊙ |
| | 20 | A1-8 | 80 | 12 | A2-11 | 9 | 3 | 8.9/1 | 80 | 4.8 | ○ | ⊙ | ⊙ | ⊙ |
| | 21 | A1-8 | 80 | 12 | A2-12 | 6 | 3 | 13.3/1 | 80 | 4.2 | ○ | ⊙ | ⊙ | ⊙ |
| | 22 | A1-12 | 79 | 12 | A2-1 | 20 | 3 | 4/1 | 79 | 4.1 | ○ | ⊙ | ⊙ | ⊙ |
| | 23 | A1-13 | 79 | 12 | A2-1 | 20 | 3 | 4/1 | 79 | 4.3 | ○ | ⊙ | ⊙ | ⊙ |
| | 24 | A1-14 | 79 | 12 | A2-1 | 20 | 3 | 4/1 | 79 | 4.5 | ○ | ⊙ | ⊙ | ⊙ |
| | 25 | A1-15 | 81 | 12 | A2-1 | 20 | 3 | 4.1/1 | 81 | 4.3 | ○ | ⊙ | ⊙ | ⊙ |
| | 26 | A1-16 | 81 | 12 | A2-1 | 20 | 3 | 4.1/1 | 81 | 4.5 | ○ | ⊙ | ⊙ | ⊙ |
| | 27 | A1-17 | 79 | 12 | A2-1 | 20 | 3 | 4/1 | 79 | 4.5 | ○ | ⊙ | ⊙ | ⊙ |
| | 28 | A1-18 | 79 | 12 | A2-1 | 20 | 3 | 4/1 | 79 | 4.3 | ○ | ⊙ | ⊙ | ⊙ |
| | 29 | A1-19 | 80 | 12 | A2-1 | 20 | 3 | 4/1 | 80 | 4.8 | ○ | ⊙ | ⊙ | ⊙ |
| | 30 | A1-20 | 81 | 12 | A2-1 | 20 | 3 | 4.1/1 | 81 | 5.0 | ○ | ⊙ | ⊙ | ⊙ |
| | 31 | A1-21 | 80 | 12 | A2-1 | 20 | 3 | 4/1 | 80 | 5.4 | ⊙ | ⊙ | ⊙ | ⊙ |
| | 32 | A1-22 | 79 | 12 | A2-1 | 20 | 3 | 4/1 | 79 | 4.9 | ○ | ⊙ | ⊙ | ⊙ |
| | 33 | A1-23 | 80 | 12 | A2-1 | 20 | 3 | 4/1 | 80 | 5.1 | ⊙ | ⊙ | ⊙ | ⊙ |
| | 34 | A1-24 | 81 | 12 | A2-1 | 20 | 3 | 4.1/1 | 81 | 5.5 | ⊙ | ⊙ | ⊙ | ⊙ |
| | 35 | A1-25 | 80 | 12 | A2-1 | 20 | 3 | 4/1 | 80 | 4.9 | ○ | ⊙ | ⊙ | ⊙ |
| | 36 | A1-24 | 80 | 12 | A2-19 | 20 | 3 | 4/1 | 80 | 4.8 | ○ | ⊙ | ⊙ | ⊙ |
| | 37 | A1-24 | 80 | 12 | A2-20 | 20 | 3 | 4/1 | 80 | 4.9 | ○ | ⊙ | ⊙ | ⊙ |
| | 38 | A1-24 | 80 | 12 | A2-22 | 20 | 3 | 4/1 | 80 | 5.1 | ○ | ⊙ | ⊙ | ⊙ |
| | 39 | A1-26 | 80 | 12 | A2-14 | 20 | 3 | 4/1 | 80 | 5.3 | ⊙ | ⊙ | ⊙ | ⊙ |
| | 40 | A1-27 | 79 | 12 | A2-14 | 20 | 3 | 4/1 | 79 | 4.8 | ○ | ⊙ | ⊙ | ⊙ |
| | 41 | A1-28 | 79 | 12 | A2-14 | 20 | 3 | 4/1 | 79 | 4.4 | ○ | ⊙ | ⊙ | ⊙ |
| | 42 | A1-8 | 80 | 12 | A2-15 | 20 | 3 | 4/1 | 80 | 4.8 | ○ | ⊙ | ⊙ | ⊙ |
| | 43 | A1-8 | 80 | 7.5 | A2-16 | 20 | 7.5 | 4/1 | 90 | 4.5 | ○ | ⊙ | ⊙ | ⊙ |
| | 44 | A1-8 | 80 | 10 | A217 | 20 | 5 | 4/1 | 85 | 5.0 | ○ | ⊙ | ⊙ | ⊙ |
| Comparative Example | 1 | A1-1 | 550 | 12 | A2-1 | 20 | 3 | 27.5/1 | 550 | 5.5 | ○ | X | ⊙ | ○ |
| | 2 | A1-11 | 9 | 12 | A2-4 | 12 | 3 | 0.75/1 | 9 | 3.6 | X | ○ | ⊙ | ○ |
| | 3 | A1-3 | 240 | 12 | A2-5 | 220 | 3 | 1.1/1 | 240 | 3.7 | X | Δ | ⊙ | ○ |
| | 4 | A1-8 | 80 | 12 | A2-13 | 4 | 3 | 20/1 | 80 | 3.8 | X | ○ | ⊙ | ○ |
| | 5 | A1-8 | 80 | 12 | A2-18 | 4 | 3 | 20/1 | 80 | 3.6 | X | ○ | ⊙ | ○ |
| | 6 | A1-8 | 80 | 12 | A2-8 | 80 | 3 | 1/1 | 80 | 3.9 | Δ | ○ | ⊙ | ○ |
| | 7 | A1-10 | 20 | 12 | A2-1 | 20 | 3 | 1/1 | 20 | 3.9 | Δ | ○ | ⊙ | ○ |

The invention claimed is:

1. A method for forming a brilliant multi-layered coating film, which comprises the steps of (1) applying an effect pigment-containing water-borne base coating composition (A1) onto a substrate to form a first base coating film, (2) applying an effect pigment-containing water-borne base coating composition (A2) onto the uncured first base coating film to form a second base coating film, and (3) heat-curing the two coating films, wherein (i) the effect pigment-containing, water-borne base coating composition (A1) has a viscosity ($V_{A1}$), as measured under the conditions of shear rate of 0.1 $sec^{-1}$ and 23° C. in temperature, at one minute after its application, within a range of 10-500 Pa·sec;

(ii) the effect pigment-containing water-borne base coating composition (A2) has a viscosity ($V_{A2}$), as measured under the conditions of shear rate of 0.1 $sec^{-1}$ and 23° C. in temperature, at one minute after its application, within a range of 5-200 Pa·sec;

(iii) the ratio between the viscosities, ($V_{A1}$)/($V_{A2}$), lies within a range of 1.3/1-22.5/1; and (iv) the effect pigment-containing water-borne base coating composition (A2) is applied while the viscosity ($V_{A3}$) of the first base coating film, as measured under the conditions of shear rate of 0.1 $sec^{-1}$ and 23° C. in temperature, is within a range of 10-500 Pa·sec; and (v) the viscosity ($V_{A1}$) of effect pigment-containing, water-borne base coating composition (A1) is optionally controlled by blending a rheology-controlling agent with the composition (A1), and the viscosity ($V_{A2}$) of effect pigment-containing, water-borne base coating composition (A2) is controlled by blending a rheology-controlling agent with the composition (A2), wherein the rheology-controlling agent in composition (A1) may be the same or different from the rheology-controlling agent in composition (A2).

2. The method according to claim 1, in which the effect pigment-containing water-borne base coating composition (A1) has a viscosity ($V_{A1}$) at one minute after its application within a range of 30-250 Pa·sec, as measured under the conditions of shear rate of 0.1 $sec^{-1}$ and temperature of 23° C.

3. The method according to claim 1, in which the effect pigment-containing water-borne base coating composition (A2) has a viscosity ($V_{A2}$) at one minute after its application within a range of 8-80 Pa·sec, as measured under the conditions of shear rate of 0.1 $sec^{-1}$ and temperature of 23° C.

4. The method according to claim 1, in which the ratio of the viscosities, ($V_{A1}$)/($V_{A2}$) is within a range of 2/1-22.5/1.

5. The method according to claim 1, in which the effect pigment-containing water-borne base coating composition (A2) is applied while the viscosity ($V_{A3}$) of the first base coating film is within a range of 30-250 Pa·sec, as measured under the conditions of shear rate of 0.1 $sec^{-1}$ and temperature of 23° C.

6. The method according to claim 1, in which the effect pigment-containing water-borne base coating composition (A1) and effect pigment containing water-borne base coating composition (A2) are water-borne coating compositions comprising water-soluble or water-dispersible main resin (a), curing agent (b) and effect pigment (c).

7. The method according to claim 6, in which the main resin (a) is acrylic resin or polyester resin containing carboxyl groups and hydroxyl groups.

8. The method according to claim 6, in which the effect pigment (c) is contained within a range of 2-50 mass parts per 100 mass parts of the combined solid contents of the main resin (a) and the curing agent (b).

9. The method according to claim 1, in which the effect pigment-containing water-borne base coating composition (A1) further contains inorganic fine particles having an average primary particle diameter not greater than 1 μm.

10. The method according to claim 9, in which the pigment mass concentration of the inorganic fine particles is within a range of 2-30%.

11. The method according to claim 9, in which the inorganic fine particles are barium sulfate fine particles.

12. The method according to claim 1, in which the effect pigment-containing water-borne base coating composition (A1) and effect pigment-containing water-borne base coating composition (A2) contain barium sulfate fine particles having an average primary particle diameter not greater than 1 μm, and the pigment mass concentration (%) of the barium sulfate fine particles contained in the effect pigment-containing water-borne base coating composition (A1) is higher than the pigment mass concentration (%) of the barium sulfate fine particles contained in the effect pigment-containing water-borne base coating composition (A2) by at least 5%.

13. The method according to claim 6, in which the curing agent (b) is an amino resin.

14. The method according to claim 1, in which the effect pigment-containing water-borne base coating compositions (A1) and (A2) contain melamine resin, the weight-average molecular weight ($M_{A1}$) of the melamine resin contained in the effect pigment-containing water-borne base coating composition (A1) is within a range of 800-5,000; the weight-average molecular weight ($M_{A2}$) of the melamine resin contained in the effect pigment-containing water-borne base coating composition (A2) is within a range of 400-4,000; and the weight-average molecular weight ($M_{A1}$) of the melamine resin contained in the effect pigment-containing water borne base coating composition (A1) is larger than the weight-average molecular weight ($M_{A2}$) of the melamine resin contained in the effect pigment-containing water-borne base coating composition (A2) by 300-4,000.

15. The method according to claim 1, in which the effect pigment-containing water-borne base coating compositions (A1) and (A2) contain at least one kind of alkyl etherified melamine resin selected from the group consisting of methyl etherified melamine resin, butyl etherified melamine resin, and methyl-butyl mixed etherified melamine resin; and the molar ratio (mol %) of the butyl group to the sum of mol numbers of methyl and butyl groups in the alkyl etherified melamine resin contained in the effect pigment-containing water-borne base coating composition (A1) is greater than the molar ratio (mol %) of the butyl group to the sum of mol numbers of the methyl and butyl groups in the alkyl etherified melamine resin contained in the effect pigment-containing water-borne base coating composition (A2) by at least 30%.

16. The method according to claim 1, in which the effect pigment-containing water-borne base coating compositions (A1) and (A2) contain alkyl etherified melamine resins, the alkyl etherified melamine resin contained in the effect pigment-containing water-borne base coating composition (A1) being methyl-butyl mixed etherified melamine resin and/or butyl etherified melamine resin, and that contained in the effect pigment-containing water-borne base coating composition (A2) being methyl etherified melamine resin.

17. The method according to claim 1, in which the solid content ($S_{A1}$) of the effect pigment-containing water-borne base coating composition (A1) is within a range of 15-45 mass %, and the solid content ($S_{A2}$) of the effect pigment-containing water-borne coating composition (A2) is within a range of 5-30 mass %, the ratio, $S_{A1}/S_{A2}$, of the solid content ($S_{A1}$) of the effect pigment-containing water-borne base coating composition (A1) to the solid content ($S_{A2}$) of the effect pigment-containing water-borne base coating composition (A2) is within a range of 1.5/1-5/1.

18. The method according to claim 1, in which the solid content ($S_{A1}$) of the effect pigment-containing water-borne base coating composition (A1) is within a range of 20-39 mass % and the solid content ($S_{A2}$) of the effect pigment-containing water-borne base coating composition (A2) is within a range of 7-9 mass %, the ratio, $S_{A1}/S_{A2}$, of the solid content ($S_{A1}$) of the effect pigment-containing water-borne base coating composition (A1) to the solid content ($S_{A2}$) of the effect pigment-containing water-borne base coating composition (A2) is within a range of 2.6/1-4.5/1.

19. The method according to claim 1, in which the ratio, $T_{A1}/T_{A2}$, of the dry film thickness ($T_{A1}$) of the coating film formed of the effect pigment-containing water-borne base coating composition (A1) to the dry film thickness ($T_{A2}$) of the coating film formed of the effect pigment-containing water-borne base coating composition (A2) is within a range of 1.5/1-5/1.

20. The method according to claim 19, in which the dry film thickness of the coating film formed of the effect pigment-containing water-borne base coating composition (A1) is within a range of 5-15 μm, and that of the coating film formed of the effect pigment-containing water-borne base coating composition (A2) is within a range of 1-5 μm.

21. The method according to claim 1, in which the substrate is a car body on which electrodeposition coating and intermediate coating have been applied by the order stated.

22. The method according to claim 1, comprising applying a clear coating composition onto the uncured second base coating film, and thereafter heating to cure the first base coating film, the second base coating film and the clear coating film simultaneously.

23. The method according to claim 13, wherein the amino resin is a melamine resin.

* * * * *